United States Patent [19]
Ogiwara

[11] 3,895,874
[45] July 22, 1975

[54] CIRCUIT FOR GENERATING SYNC PULSES FOR USE IN DETECTING OUTPUT SIGNALS OF SPECTROPHOTOMETER OR THE LIKE

[75] Inventor: Yutaka Ogiwara, Niiza, Japan

[73] Assignee: Nippon Kogaku K.K., Tokyo, Japan

[22] Filed: Mar. 19, 1974

[21] Appl. No.: 452,522

[30] Foreign Application Priority Data

Mar. 26, 1973 Japan ............................... 48-33470
Mar. 26, 1973 Japan ............................... 48-33471

[52] U.S. Cl. ...................... 356/93; 328/63; 356/95; 356/97

[51] Int. Cl. ............................................. G01j 3/42

[58] Field of Search ............ 328/63; 356/93, 95, 97

[56] References Cited

UNITED STATES PATENTS 2,955,508 10/1960 Martin ................................ 356/93
3,390,605 7/1968 Nagamura........................ 356/93 X

*Primary Examiner*—R. V. Rolinec
*Assistant Examiner*—Lawrence J. Dahl
*Attorney, Agent, or Firm*—Fitzpatrick, Cella, Harper & Scinto

[57] ABSTRACT

A digital type electronic circuit for generating sync separation and rectification pulses for use in detecting the output signals of a spectrophotometer, or the like, using a chopper. The circuit comprises means adapted to generate a first clock pulse synchronous with the electrical signal for driving the chopper; means adapted to generate one pulse whose pulse duration equals that of the first clock pulse, for each revolution of said chopper; shift registers for receiving the pulse, and having a number of outputs capable of being shifted to the following stages during one revolution of the chopper; and means adapted to select and synthesize the outputs of the shift registers.

5 Claims, 59 Drawing Figures

FIG. 4(a), FIG. 4(b), FIG. 4(c), FIG. 4(d), FIG. 4(e), FIG. 4(f), FIG. 4(g), FIG. 4(h), FIG. 4(i), FIG. 4(o), FIG. 4(1), FIG. 4(2), FIG. 4(3), FIG. 4(4), FIG. 4(5), FIG. 4(6), FIG. 4(7), FIG. 4(8), FIG. 4(9), FIG. 4(10), FIG. 4(11), FIG. 4(12), FIG. 4(13), FIG. 4(14), FIG. 4(15), FIG. 4(R'), FIG. 4(S'), FIG. 4(O')

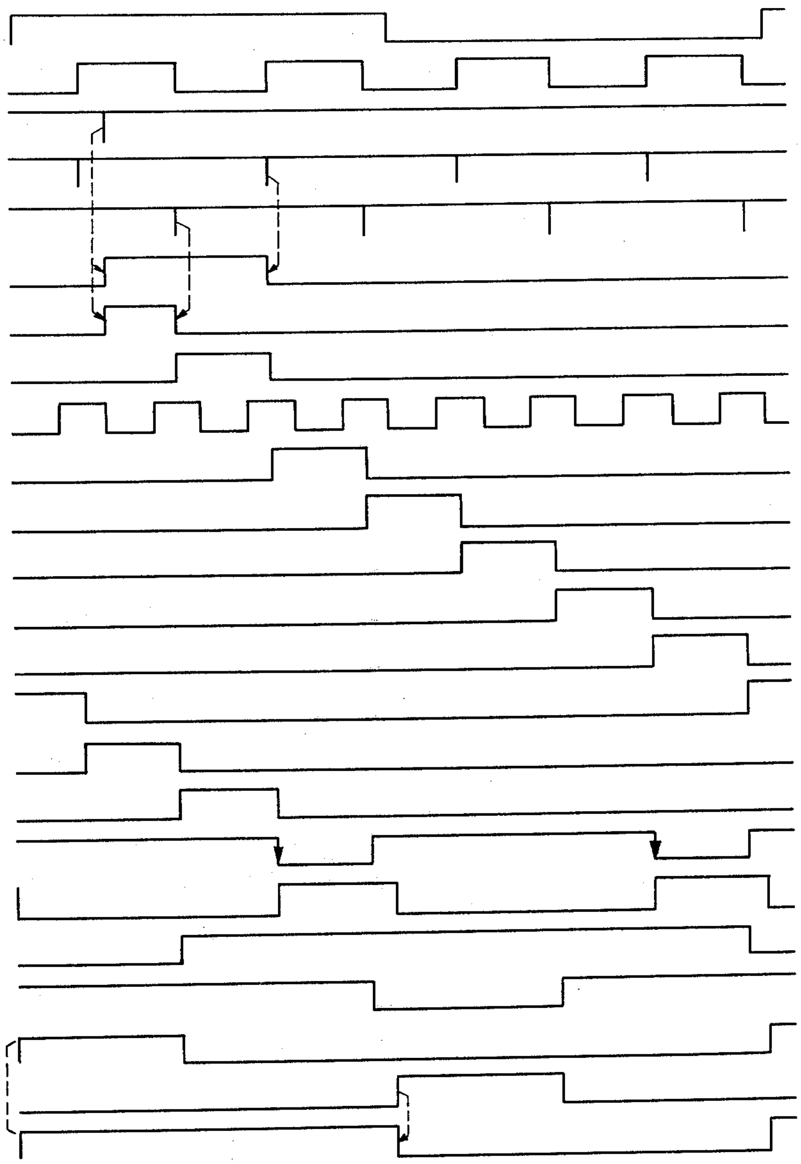
FIG. 7(a), FIG. 7(b), FIG. 7(c), FIG. 7(d), FIG. 7(e), FIG. 7(f), FIG. 7(g), FIG. 7(h), FIG. 7(i), FIG. 7(o), FIG. 7(1), FIG 7(2), FIG. 7(3), FIG. 7(4), FIG. 7(5), FIG. 7(6), FIG. 7(7), FIG. 7(j), FIG. 7(k), FIG. 7(ℓ), FIG. 7(m), FIG. 7(n), FIG. 7(p), FIG. 7(q)

CIRCUIT FOR GENERATING SYNC PULSES FOR USE IN DETECTING OUTPUT SIGNALS OF SPECTROPHOTOMETER OR THE LIKE

BACKGROUND OF THE INVENTION

1. Field of the Invention

The present invention relates to a circuit for generating sync separation and rectification pulses for use in detecting the output signals of a spectrophotometer, or the like.

2. Description of the Prior Art

A method utilizing a mechanical chopper for generating sync separation and rectification pulses for detecting the output signals of a spectrophotometer, or the like, is known in the art. However, that method is not capable of providing measurements with a sufficient degree of accuracy to suit present day needs in the field of spectrophotometry.

Accordingly, I have conceived by the present invention means whereby I am able to overcome the foregoing difficulty. More specifically, I provide a digital type electronic circuit for generating sync separation and rectification pulses.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIGS. 7(*a*) – 7(*i*), 7(0) - 7(7) and 7(*j*) - 7(*q*) are timing charts used for the explanation of the mode of operation thereof.

DESCRIPTION OF THE PREFERRED EMBODIMENTS

Figure 1A:
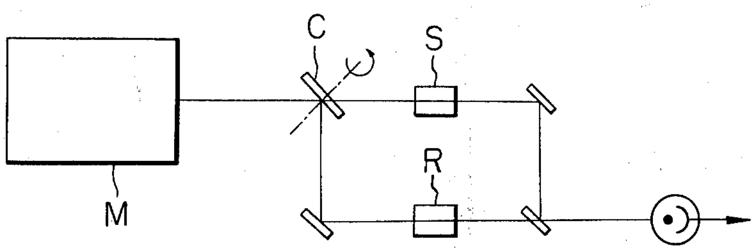
FIGS. 1(*a*), 1(*b*) and 1(*c*) are schematic diagrams os a spectrophotometer.
Figure 1B:
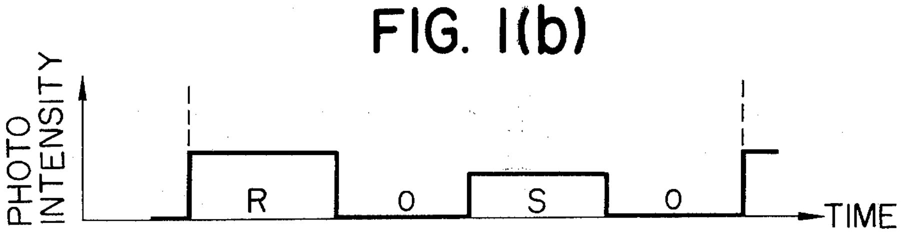
Figure 1C:
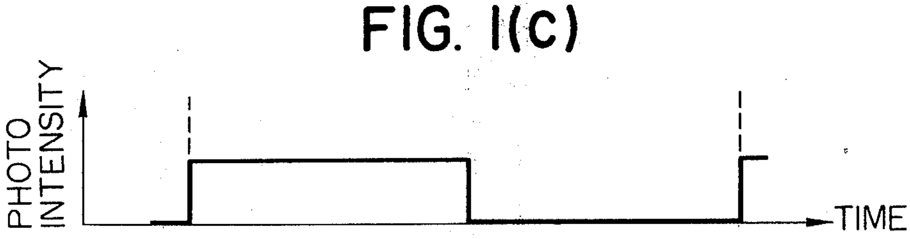

Referring first to FIG. 1, I will briefly describe a spectrophotometer which is used with a sync pulse generator in accord with the present invention. FIG. 1(*a*) is a block diagram of a double-beam type spectrophotometer in which the monochromatic light isolated by a monochromator M is alternately transmitted by a chopper C through a sample cell S and a reference cell R and detected by a detector such as a photocell, so that the output signal as shown in FIG. 1(*b*) is obtained. The output signal consists of a reference signal R, a sample signal S and a dark signal O. A time interval between two vertical broken lines, that is, between the leading edges of first and second reference signals, corresponds to the time required for the chopper C to make one rotation. In the case of a single-beam type spectrophotometer, the signal as shown in FIG. 1(*c*) is obtained.

Figure 2:
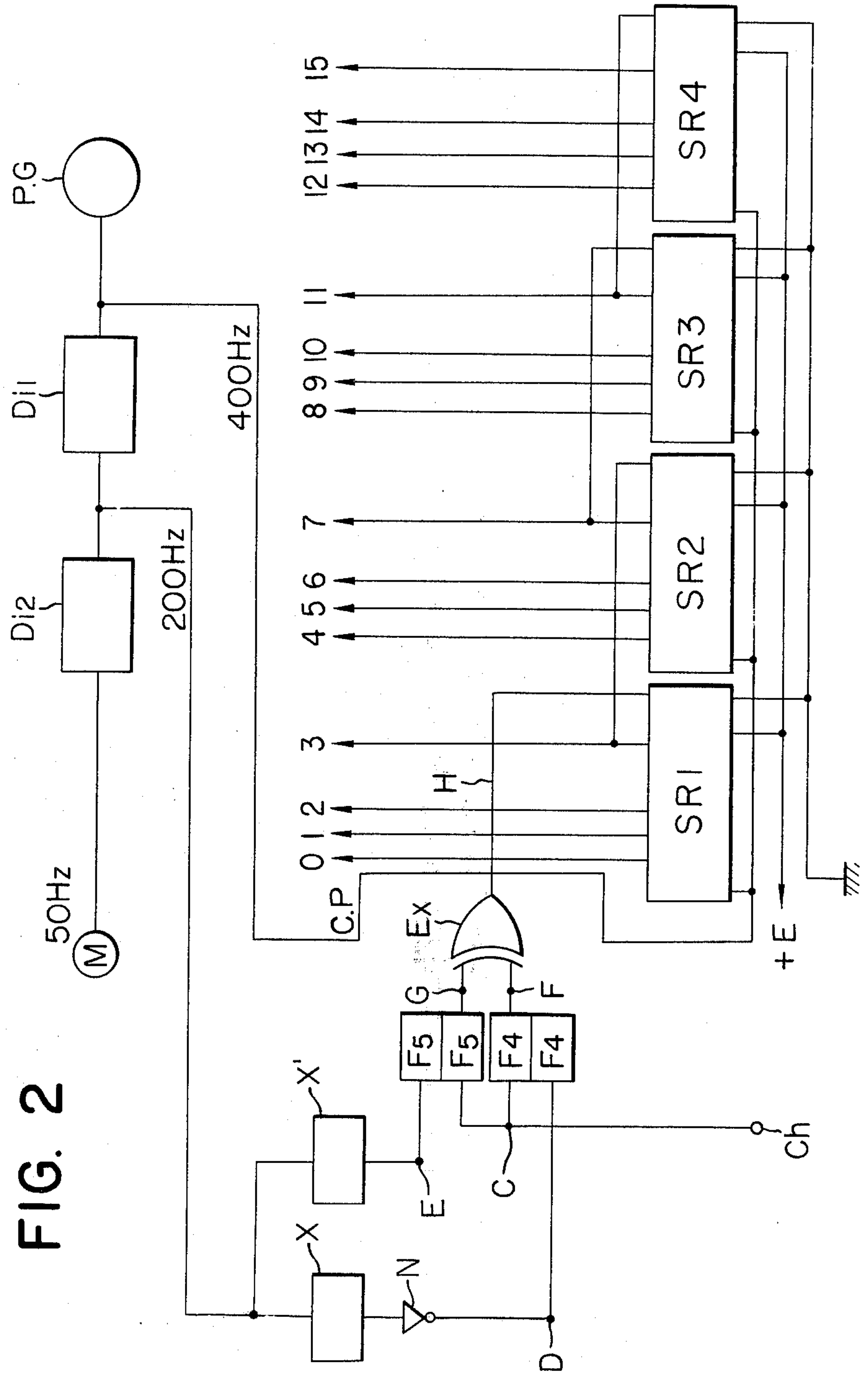
FIGS. 2 and 3 are diagrams of a sync separation pulse generating circuit in accord with the present invention.

Referring next to FIG. 2, I will describe a sync selection pulse generating circuit for use with, for instance, a spectrophotometer. The frequency 400 Hz of the output pulse of a clock pulse generator P.G. is stepped down by a first or one-half frequency divider $Di_1$ into 200 Hz, which is further stepped down to 50 Hz by a second or one-fourth frequency divider $Di_2$. The clock pulse of 50 Hz is used to drive a motor M which in turn drives the chopper C. The leading edge of the pulse of 400 Hz is differentiated by a first differentiator X while the trailing edge, by a second differentiator X'. Since a NOT gate is connected to the output of the first differentiator X the trigger pulse appearing at the points D and E are opposite in phase.

The pulses in synchronism with the rotation of the chopper C are applied to a terminal *Ch*. That is, whenever the chopper C makes one rotation, one trigger pulse is applied to the terminal *Ch*. The points E, C and D are connected to the input terminals of flip-flops F–4 and F–5. The outputs of the flip-flops F–4 and F–5 appearing at the points G and F are applied to the input terminals of an EXCLUSIVE-OR gate EX, the output of which is applied to a shift register SR1. The shift register SR1 is interconnected with shift registers SR2, SR3, and SR4 in such a way that in response to the clock pulses of 400 Hz supplied from the pulse generator P.G., the output signals may be derived from 16 output terminals 0–15. The shift registers SR1-SR4 are adapted to shift their contents to the next shift registers within one pulse-recurrence period of the trigger pulse generated in synchronism with the rotation of the chopper.

Figure 3:
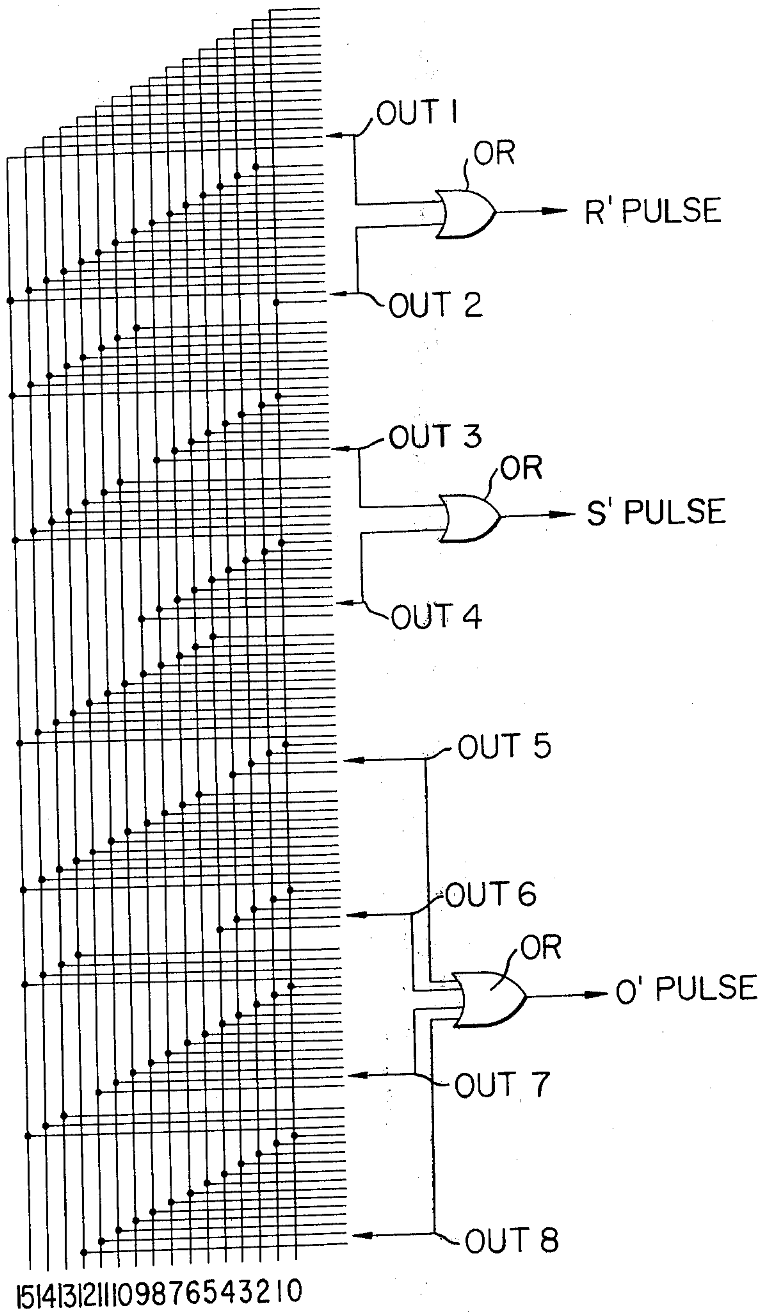

As is shown in FIG. 3, the output terminals 0–15 are connected so that interlocked switches, such as eight stage rotary switches OUT1 – OUT8, are adapted to select the output signals 0–15.

Figure 4:
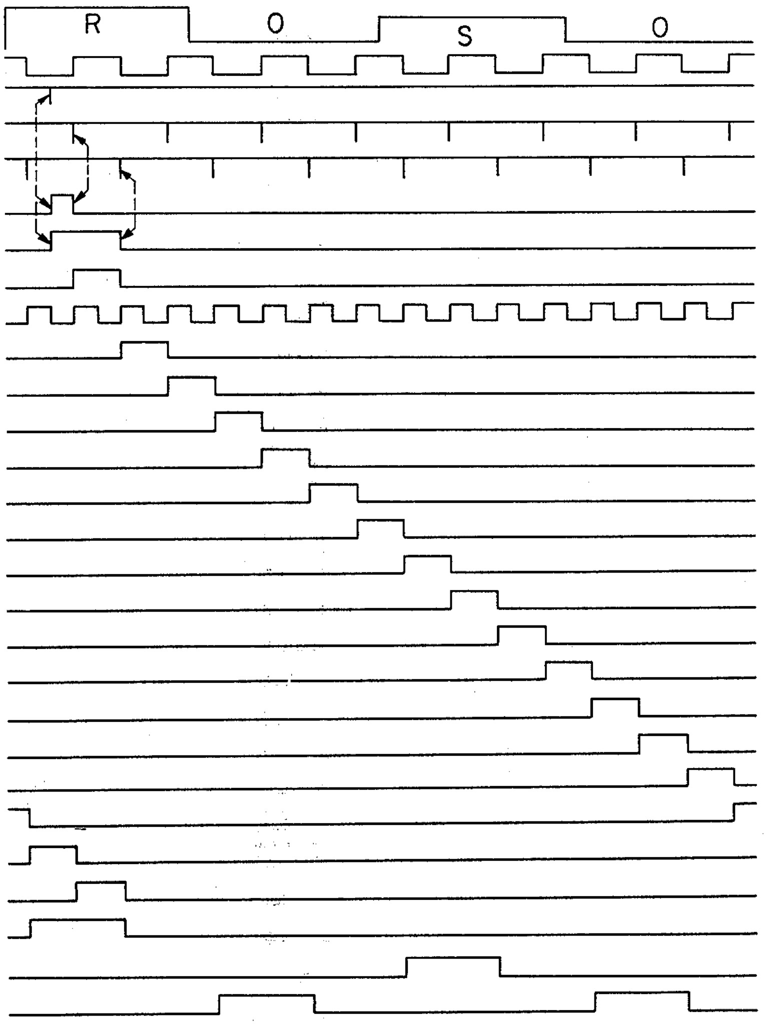
FIGS. 4(*a*) - 4(*i*), 4(0) - 4(15), and 4(R') - 4(0') are timing charts used for the explanation of the mode of operation thereof.

Next, I will describe the mode of operation with further reference to FIG. 4 wherein FIG. 4(*a*) shows the output signals of the double-beam spectrophotometer shown in FIG. 1. R indicates a reference signal; S a sample signal; and O a dark signal. As is well known in the art, the sync separation pulse consists of three types of pulses synchronized with the above three signals. FIG.4(*b*) shows the clock pulses of 200 Hz. FIG. 4(*d*) shows the trigger pulses which are obtained by differentiating the leading edges of the clock pulses of 200 Hz and passing the output signals of the first differentiator X through the NOT element. FIG. 4(*e*) shows the trigger pulses obtained by differentiating the trailing edges of the clock pulses of 200 Hz by the second differentiator X'. The trigger pulses shown in FIGS. 4(d) and 4(e) appear at the points D and E in FIG. 2, respectively. FIG. 4(*c*) shows the pulse which appears at the point C in FIG. 2 in synchronism with the rotation of the chopper. That is, one pulse appears at the point C in FIG. 2 each cycle of the reference, dark, sample and dark signals. Since the pulses shown in FIGS. 4(*c*), 4(*d*) and 4(*e*) are applied to the flip-flops F–4 and F–5 shown in FIG. 5, the outputs of waveforms as shown in FIGS. 4(*f*) and 4(*g*) appear at the points F and G in FIG. 2, and are applied to the EXCLUSIVE-OR gate EX so that the output of waveform as shown in FIG. 4(*h*) is obtained at the point H. When the output of the waveform shown in FIG. 4(h) is applied to the shift registers SR1-SR4, the outputs of waveforms shown in FIGS. 4(0)–4(15) are obtained at the output terminals 0–15 in synchronism with the clock pulses CP of 400 Hz. When the outputs of waveforms of FIGS. 4(1)–4(15) are applied to the circuits shown in FIG. 3, the output signals of the waveforms shown in FIGS. 4(R′), 4(S′) and 4(O′) are obtained from three OR gates, respectively. That is, the pulse R′ in synchronism with the reference signal R consists of the pulses shown in FIGS. 4(14)–4(15); the pulses S′ in synchronism with the sample signal S, the pulses shown in FIGS. 4(6) and 4(7); and the pulses O′, the pulses shown in FIGS. 4(2), 4(3) and FIGS. 4(10) and 4(11), respectively. In the instant embodiment, two output pulses are derived at one time in order to prevent erratic operation, but it is to be understood that three output pulses may be derived at one time.

As is readily seen from FIGS. 4, the selection of the output pulses by the interlocked switches shown in FIG. 3 is dependent upon the position of the pulse which is in synchronism with the rotation of the chopper C. It will also readily be understood that the number of outputs of the shift registers is varied in response to the pulse-recurrence frequency of the pulses shown in FIG. 4(*c*). The pulse-recurrence frequency corresponds to the rotational speed of the chopper C, but is different from the frequency 50 Hz of the pulses used to drive the motor M. In like manner, the number of outpus of the shift registers is varied in response to the recurrence frequency of the clock pulse CP.

Figure 5:
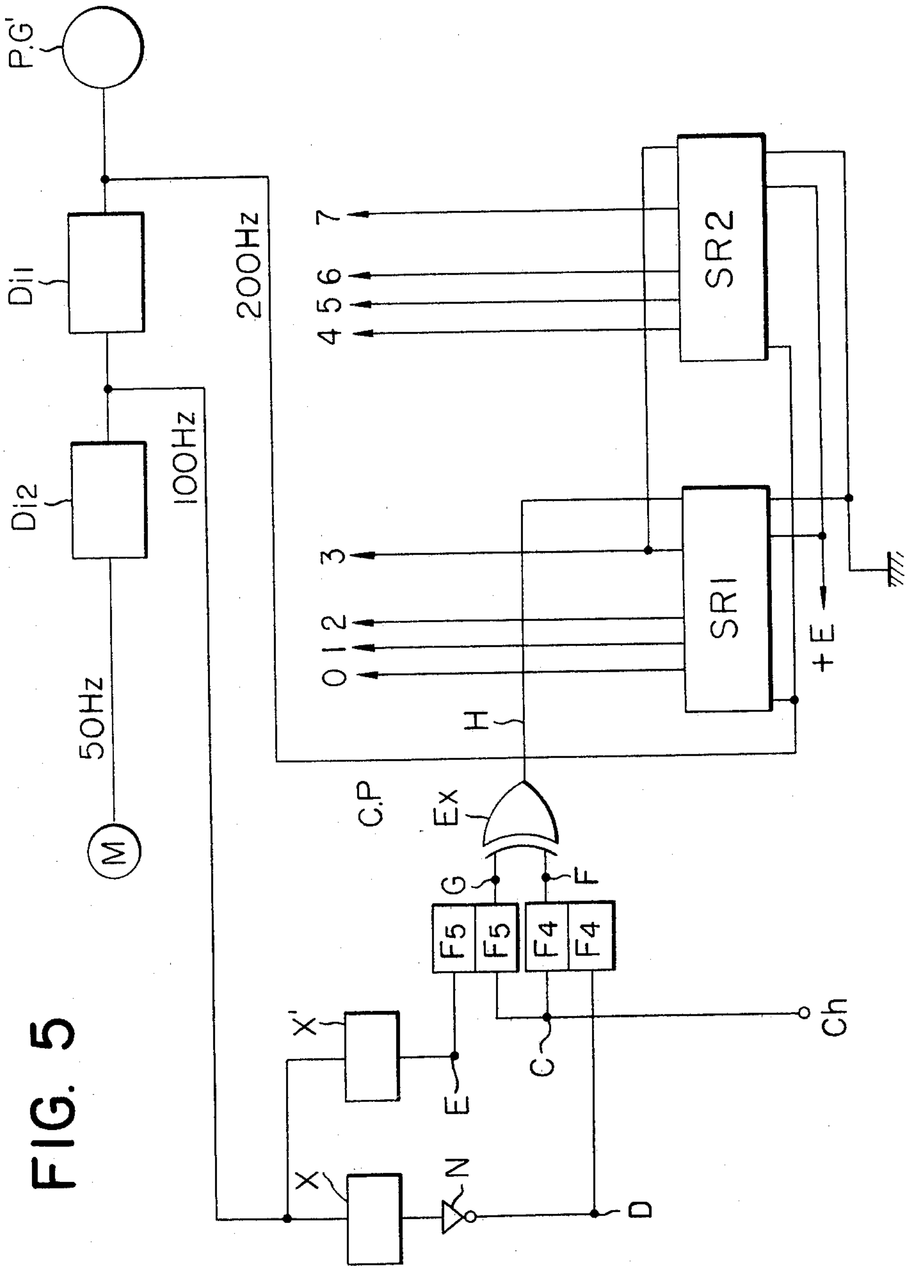
FIGS. 5 and 6 are diagrams of a sync rectification pulse generating circuit in accord with the present invention.

Next, a sync rectification pulse generating circuit will be described hereinafter with reference to FIGS. 5–7. A circuit shown in FIG. 5 is substantially similar in construction to that shown in FIG. 2 except that the pulse generator PG′ generates the clock pulses of 200 Hz, and that the clock pulses of 100 Hz divided by the one-half frequency divider D*i*–1 are applied to the differentiators X and X′. Only two shift registers SR1 and SR2 are used so that they have eight output terminals 0–7.

Figure 6:
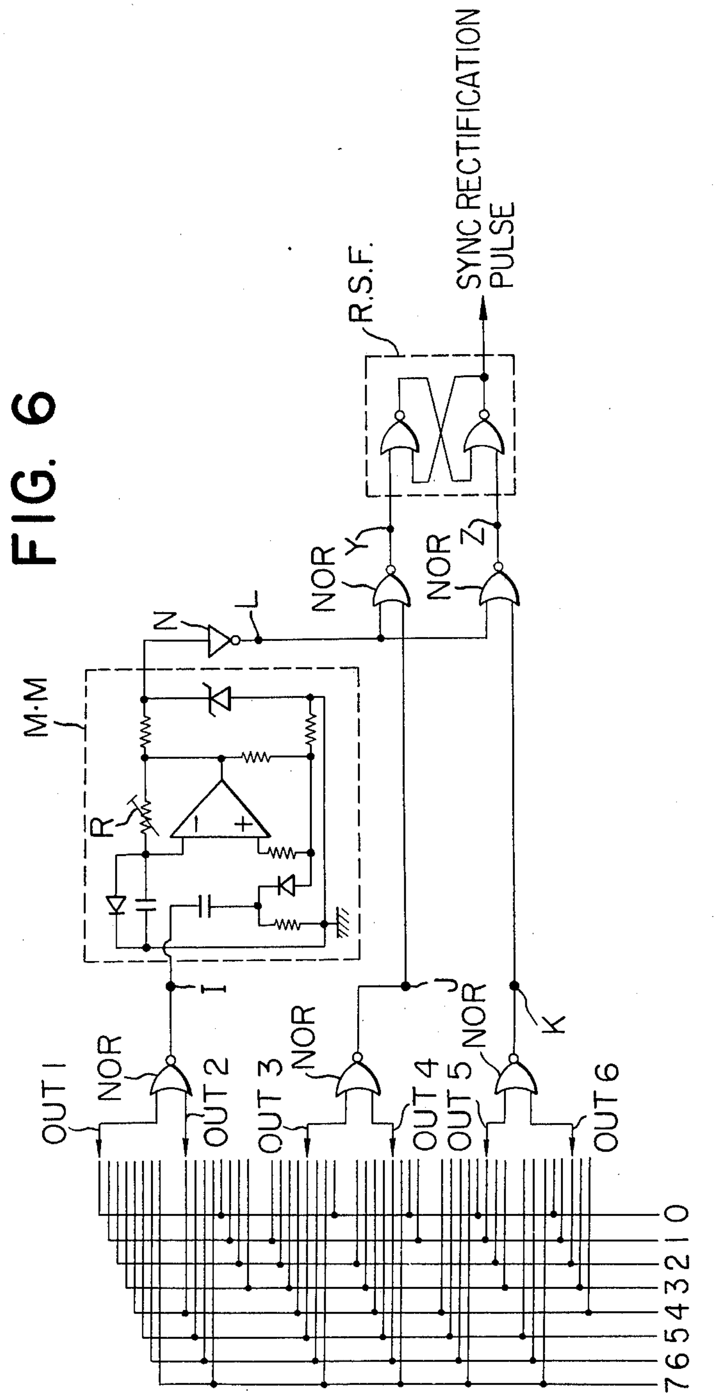

The eight output terminals 0–7 are connected as shown in FIG. 6 in which OUT1-OUT6 are interlocked switches such as a six-stage rotary switch; NORs are NOR gates; M.M. is a monostable multivibrator; N is a NOT gate; R is a potentiometer; and R.S.F. is a R–S flip-flop.

Referring now to FIG. 7, the mode of operation will be described. FIG. 7(a) shows the output signal of the single-beam spectrophotometer shown in FIG. 1. The sync rectification pulses are those in complete synchronism with the leading and trailing edges of the output pulse shown in FIG. 7(*a*). FIG. 7(*b*) shows the clock pulses of 100 Hz. FIG. 7(*d*) shows the trigger pulses obtained by differentiating the clock pulses by the differentiator X and passing the output signals of the differentiator X through the NOT element N. FIG. 7(*e*) shows the trigger pulses obtained by differentiating the trailing edges of the clock pulses by the differentiator X′. These trigger pulses appear at the points D and E, respectively. FIG. 7(*c*) shows the pulse appearing at the point C in FIG. 5 in synchronism with the rotation of the chopper. Since the pulses shown in FIGS. 7(c), 7(*d*) and 7(*e*) are fed into the flip-flops F–4 and F–5 shown in FIG. 5, the outputs of the waveforms shown in FIGS. 7(*f*) and 7(*g*) appear at the points F and G, respectively. These outputs are fed into the EXCLUSIVE OR EX so that the output of waveform as shown in FIG. 7(*h*) appears at the point H. The output shown in FIG. 7(*h*) is fed into the shift registers SR1 and SR2 so that the outputs of waveforms as shown in F s. 7(0)-7(7) are obtained at the output terminals 0–7 in synchronism with the clock pulses CP of 200 Hz shown in FIG. 7(*i*). The number of outputs of the shift registers SR-1 and SR-2 shown in FIG. 5, is varied not only in response to the pulse-recurrence frequency of the pulses shown in FIG. 7(*c*), but also in response to the frequency of the clock pulses CP.

The outputs of the shift registers 0–7 are applied to the circuit shown in FIG. 6. The interlocked swtiches OUT1 and OUT2 selects the pulses most closely positioned to the leading and trailing edges of the pulse signal shown in FIG. 7(*a*) and pass them through the NOR gate NOR so that the output of waveform shown in FIG. 7(*j*) may be obtained. The method for selecting the outputs 0–7 may be previously detected depending upon the position of the pulse in synchronism with the rotation of the chopper. The output of the NOR gate is applied to monostable multivibrator M.M. The output of the monostable multivibrator M.M. passes through the NOT gate N so that the output of the waveform which is in complete synchronism with the leading and trailing edges of the pulse signal shown in FIG. 7(*a*) may be obtained at the point L as shown in FIG. 7(*k*). FIGS. 7(*l*) and 7(*m*) show the waveforms of the signals appearing at the points J and K in FIG. 6, respectively. These pulse signals serve to divide the pulse signals shown in FIG. 7(*k*) into the pulse FIG. 7( *n*) representing the leading edge of the output signal shown in FIG. 7(*a*) and into the pulse representing the trailing edge thereof. That is, the interlocked switches OUT3 and OUT4 select the outputs 5 and 6 while the interlocked switches OUT5 and OUT6 select the outputs 5 and 6. The pulses shown in FIGS. 7(*k*) and 7(*l*) are applied to the NOR gate shown in FIG. 6 so that the output of waveform as shown in FIG. 7(*n*) appears at the point Y. When the outputs shown in FIGS. 7(*k*) and 7(*m*) are applied to the NOR gate, the output of waveform shown in FIG. 7(*p*) appears at the point Z. The output as shown in FIG. 7(n) is applied to the RS flip-flop R.S.F. shown in FIG. 6 as a set input while the output shown in FIG. 7(*p*) is applied as a reset into so that the sync rectification pulse in synchronism with the pulse signal shown in FIG. 7(*a*) may be obtained as the output as shown in FIG. 7(*q*). Thus, the output signal of the single-beam spectrophotometer may be analysed in the conventional manner.

In the instant embodiment, in order to prevent erratic operation, the interlocked switches OUT3 and OUT4 select the outputs 5 and 6 of the shift register SR2 while the interlocked switches OUT5 and OUT6 select the outputs 1 and 2, but it may be understood that the switches OUT3 and OUT5 are so arranged as to select the outputs 5 and 1, respectively, and that the switches OUT4 and OUT6 may be eliminated.

While the method for generating the sync rectification pulses for one pulse obtained in one cycle of the single-beam spectrophotometer has been described, it will be understood that when a plurality of sync rectification pulse generating circuits of the type are provided, the sync rectification pulses for the output pulse signals obtained in one cycle of a double-beam type spectrophotometer may be obtained.

From the foregoing description, it will be seen that the sync pulse generating circuit in accord with the present invention may eliminate the prior art mechanical means and can generate the precise separation and rectification pulses by digital systems once the pulse generating circuits are started in synchronism with the rotation of the chopper. Furthermore, the clock pulses is stepped down in frequency so as to drive the motor which in turn drives the chopper so that the pulse generating circuits may be brought into complete synchronism with the choppers.

I believe that the construction and operation of my novel sync pulse generating circuit will now be understood and that the advantages thereof will be fully appreciated by those persons skilled in the art.

I claim:

1. A circuit for generating sync pulses for use in detecting the output signals of a measuring instrument such as a double-beam spectrophotometer using a chopper which is rotated in response to the electrical signal, said circuit comprising:

i. means (PG, Di–1) adapted to generate a first clock pulse (*b*) in synchronism with said electrical signal,
ii. means adapted to generate one pulse (*h*) whose pulse duration equals that of said first clock pulse for each revolution of said chopper (*c*),
iii. shift registers (SR1-SR4) for receiving said pulse (h), and having a number of outputs capable of being shifted to the following stages during one rotation of said chopper (c); and
iv. means adapted to select and synthesize the outputs of said shift registers (SR1-SR4) contained in the components (R,S,O) of said output signal (*a*) of said measuring instrument which components are to be separated from each other.

2. A circuit as defined in claim 1, wherein said means adapted to generate one pulse per revolution of said chopper (*c*) comprises:

i. a first differentiator (X) adapted to differentiate the leading edge of said first clock pulse;
ii. a second differentiator (X′) adapted to differentiate the trailing edge of said first clock pulse;
iii. means adapted to generate one pulse (C*h*) per revolution of said chopper;
iv. a first flip-flop circuit for receiving said pulse (Ch) and the output of one of said first or second differentiators (X or X′);
v. a second flip-flop circuit for receiving the output (C*h*) of said means and the output of the other of said differentiators (X′ or X); and
vi. an EXCLUSIVE-OR gate for receiving the outputs of said first and second flip-flops.

3. A circuit as defined in claim 1, wherein said means adapted to select and synthesize the output of said shift registers comprises:

a plurality of logic addition circuits (OR) whose number equals the number of said components of said output signal to be separated from each other.

4. A circuit for generating sync pulse for use in detecting the output signal of a measuring instrument such as a single-beam spectrophotometer using a chopper (c) which is driven by the electrical signal, said circuit comprising:

i. means adapted to generate a first clock pulse (b) in synchronism with said electrical signal for driving said chopper (*c*);
ii. means adapted to generate one pulse (h) whose pulse duration equals that of said first clock pulse for each revolution of said chopper (*c*);
iii. shift registers (SR1-SR2) for receiving said pulse (*h*), and having a number of outputs capable of being shifted to the following stages during one rotation of said chopper (*c*) and which uses a second clock pulse (*i*) in synchronism with said first clock pulse;
iv. a logic addition circuit (NOR) to which are applied the output pulses (OUT1, OUT2) of said shift registers which are generated first and positioned most closely to the leading and trailing edges of said output pulse of said measuring instrument;
v. means (M.M.) adapted to synchronize the pulse component of said output of said logic addition circuit which is positioned most closely to said leading edge with said leading edge of said output pulse signal of said measuring instrument and also adapted to synchronize the pulse component of said output of said logic addition circuit which is positioned most closely to said trailing edge with said trailing edge of said pulse signal of said instrument;
vi. means (OUT3, OUT4, NOR, NOR, NOR, NOR) adapted to generate, in response to the output of said synchronizing means (v), a first signal (*n*) whose leading edge is synchronized with that of said output pulse signal of said instrument and a second signal (*p*) whose leading edge if synchronized with the trailing edge of said output pulse signal of said instrument; and
vii. a R-S flip-flop (RSF) to which are applied said first and second signals.

5. A circuit as defined in claim 4, wherein means adapted to generate one pulse per revolution of said chopper comprises:

i. a first differentiator (X) adapted to differentiate the leading edge of said first clock pulse;
ii. a second differentiator (X′) adapted to differentiate the trailing edge of said first clock pulse;
iii. means adapted to generate one pulse per revolution of said chopper,
iv. a first flip-flop (F4) for receiving said pulse (Ch) generated whenever said chopper completes one revolution and the output of one of said first and second differentiators (X, X′);
v. a second flip-flop (F5) for receiving said pulse generated whenever said chopper completes one revolution and the output of the other differentiator; and
vi. an EXCLUSIVE-OR gate for receiving the outputs of said first and second flip-flops.

* * * * *

UNITED STATES PATENT OFFICE
CERTIFICATE OF CORRECTION

Patent No. 3,895,874 Dated July 22, 1975

Inventor(s) YUTAKA OGIWARA

It is certified that error appears in the above-identified patent and that said Letters Patent are hereby corrected as shown below:

Column 1, line 46, change "diagrams os" to -- diagrams of --.

Column 4, line 40, after "OUT6 select the outputs" change "5 and 6" to -- 1 and 2 --.

Column 6, line 37, change "edge if" to -- edge is --.

Signed and Sealed this

*fourth* Day of *November 1975*

[SEAL]

*Attest:*

RUTH C. MASON
*Attesting Officer*

C. MARSHALL DANN
*Commissioner of Patents and Trademarks*